(12) United States Patent
Takakubo (10) Patent No.: US 6,831,763 B2
(45) Date of Patent: Dec. 14, 2004

(54) SCANNING OPTICAL SYSTEM (75) Inventor: Yutaka Takakubo, Saitama-ken (JP)

(73) Assignee: PENTAX Corporation, Tokyo (JP)

(*) Notice: Subject to any disclaimer, the term of this patent is extended or adjusted under 35 U.S.C. 154(b) by 0 days.

(21) Appl. No.: 10/658,457

(22) Filed: Sep. 10, 2003

(65) Prior Publication Data
US 2004/0047018 A1 Mar. 11, 2004

(30) Foreign Application Priority Data
Sep. 11, 2002 (JP) .......................................... 2002-265668

(51) Int. Cl.⁷ ............................................. G02B 26/08
(52) U.S. Cl. ........................ 359/204; 359/205; 359/207; 359/216; 347/244
(58) Field of Search ................................. 359/204–207, 359/662, 216–219; 347/233, 243, 244

(56) References Cited

U.S. PATENT DOCUMENTS

| 6,313,906 | B1 | 11/2001 | Nagasaka et al. |
| 6,317,245 | B1 | 11/2001 | Hama et al. |
| 6,392,772 | B1 | 5/2002 | Hama et al. |
| 6,392,773 | B1 | 5/2002 | Hama et al. |
| 6,396,615 | B1 | 5/2002 | Hama et al. |
| 6,452,687 | B1 | 9/2002 | Suzuki et al. |
| 6,734,890 | B2 * | 5/2004 | Takeuchi et al. ............ 347/244 |

FOREIGN PATENT DOCUMENTS

| JP | 11-84285 | 3/1999 |
| JP | 11119131 | 4/1999 |
| JP | 11326804 | 11/1999 |

* cited by examiner

Primary Examiner—James Phan
(74) Attorney, Agent, or Firm—Greenblum & Bernstein, P.L.C.

(57) ABSTRACT

In a scanning optical system including a polygon mirror for dynamically deflecting N laser beams corresponding to N color components and an imaging optical system for converging the laser beams into spot beams on N photosensitive drums respectively, the imaging optical system includes: a front lens group for converging the laser beams principally in a main scanning direction while deflecting the beams to deviate from its optical surface reference axis; and N rear lens groups for converging the laser beams principally in an auxiliary scanning direction respectively. The rear surface of the front lens group and front surfaces of the rear lens groups are formed as two-dimensional polynomial aspherical surfaces. Concretely, the rear surface is formed as a step-like optical surface having N discrete areas of different heights. By the system, the laser beams are separated sufficiently to match the intervals between the photosensitive drums without the need of long optical paths, without deteriorating the scanning performance, and without the need of using mirrors which cause color misregistration and increase costs.

14 Claims, 8 Drawing Sheets

FIG.7A — fθ ERROR OUTER OPTICAL SYSTEM

FIG.7B — CURVATURE OF FIELD OUTER OPTICAL SYSTEM
·········· MAIN SCANNING DIRECTION
────── AUXILIARY SCANNING DIRECTION

FIG.7C — SCAN LINE CURVE OUTER OPTICAL SYSTEM

FIG.7D — WAVEFRONT ABERRATION OUTER OPTICAL SYSTEM

SCANNING OPTICAL SYSTEM

BACKGROUND OF THE INVENTION

The present invention relates to a scanning optical system to be installed in printing devices such as color printers and color copy machines.

As is widely known, a scanning optical system dynamically deflects a laser beam (which has been on-off modulated according to image information) by use of a rotational polygon mirror and converges the dynamically deflected laser beam on a surface of a photosensitive drum (scan target surface) by use of an imaging optical system, by which the spot beam is scanned on the scan target surface at a constant speed in a main scanning direction and thereby an electrostatic latent image composed of a plurality of dots is formed on the scan target surface.

In conventional scanning optical systems installed in color printing devices, each photosensitive drum for each color component (e.g. yellow, magenta, cyan, black) was generally provided with one rotational polygon mirror and one imaging optical system for its own (see U.S. Pat. No. 6,452,687, for example) However, there have recently been developed scanning optical systems in which a rotational polygon mirror and part of an imaging optical system are shared among the color components in order to reduce manufacturing costs of printing devices (see U.S. Pat. No. 6,313,906, for example).

In such a scanning optical system, each of N laser beams (N: the number of color components) before reaching the rotational polygon mirror may be "tilted" in a plane that is parallel to the central axis of the polygon mirror so that the beams will travel along the plane and then intersect at a point in the vicinity of a reflecting surface of the polygon mirror. Such a technique has been elaborated on in the specification and figures of U.S. patent application Ser. No. 10/294,615 previously filed by the assignee of the present invention. In this case, after being reflected by the rotational polygon mirror, the N laser beams pass through a common front lens group of the imaging optical system gradually separating from one another as shown in FIG. 9 (cross-sectional view of the scanning optical system), pass through N rear lens groups of the imaging optical system respectively, and are then incident on N photosensitive drums parallelly arranged at preset intervals respectively.

Figure 9:
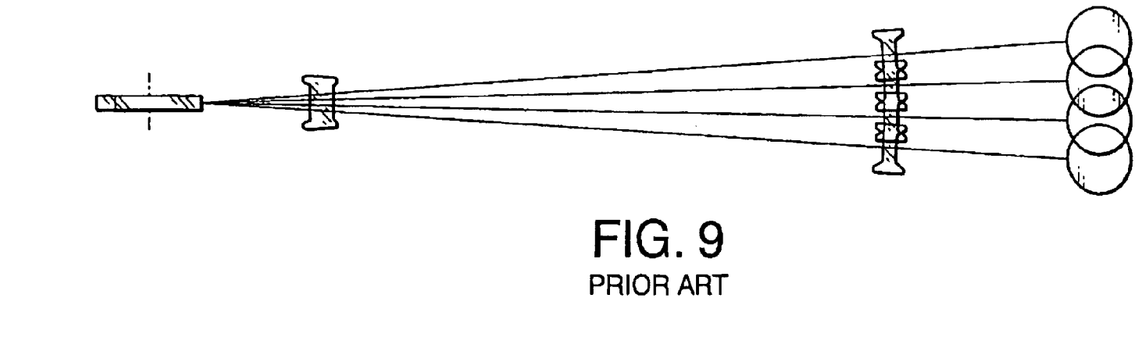
FIG. 9 is a schematic diagram showing optical paths of laser beams in a conventional scanning optical system.

Incidentally, while the photosensitive drums shown in FIG. 9 overlap with one another, enough space is kept between any two adjacent photosensitive drums in actual scanning optical systems so that necessary parts (development module, toner cartridge, etc.) can be placed in the space. Therefore, in such a scanning optical system, any two adjacent laser beams to be incident on the photosensitive drums have to be separated from each other to match the distance (interval) between adjacent photosensitive drums.

Figure 10:
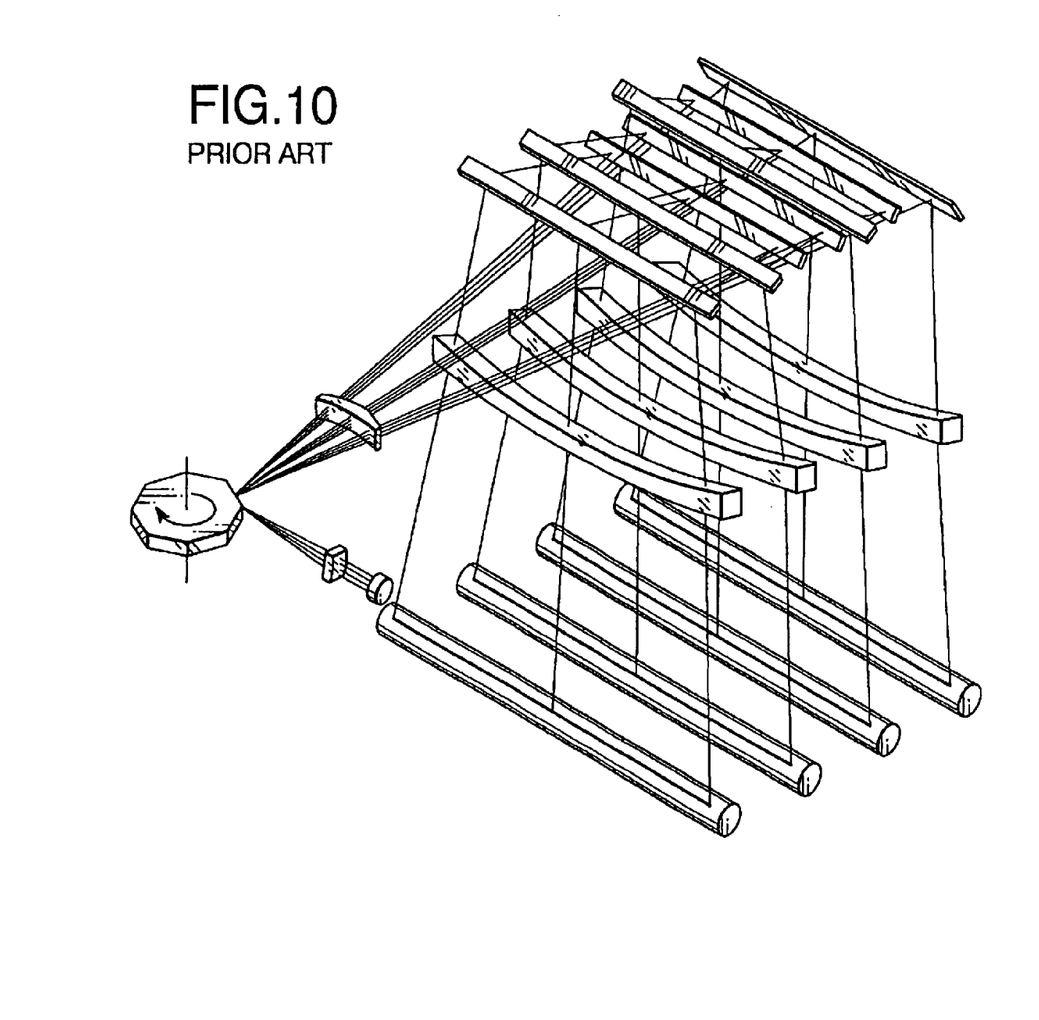
FIG. 10 is a perspective view schematically showing the optical composition of a conventional scanning optical system.

In order to realize the separation of the laser beams, the scanning optical system has to be designed employing one of the following three configurations: a first configuration in which the optical path length between the polygon mirror and each photosensitive drum is set long; a second configuration in which the angle between adjacent laser beams incident on the polygon mirror is set large; and a third configuration in which the optical path of each laser beam after passing through the front lens group is bent by one or more mirrors and thereby the separation between adjacent laser beams is increased as shown in FIG. 10.

However, the first configuration has the disadvantage of increasing the size of the printing device. Meanwhile, in the second configuration, it is difficult to correct scan line curves and twist of wavefront aberration (twist of the wavefront) at the same time, by which attaining enough scanning performance becomes difficult. Consequently, the third configuration like the one shown in FIG. 10 is generally employed for the above-described scanning optical system.

However, in the third configuration like FIG. 10 in which mirrors are placed on the optical paths of the laser beams, the cost for manufacturing the system rises as the number of optical elements increases. Further, if the precision of each mirror surface Is not maintained high, scanning performance of the system tends to vary among the color components and thereby misregistration or misalignment in color superposition (hereafter called "color misregistration") occurs when a plurality of images of the color components are overlaid.

SUMMARY OF THE INVENTION

The present invention is advantageous in that it provides a scanning optical system capable of sufficiently separating the laser beams to match the intervals between the photosensitive drums without the need of long optical paths, without deteriorating the scanning performance, and without the need of using mirrors causing the color misregistration and increasing the cost.

In accordance with an aspect of the present invention, there is provided a scanning optical system for dynamically deflecting a plurality of laser beams by a deflecting system for a plurality of scan targets which are provided corresponding to the laser beams and parallelly arranged at preset intervals, converging the dynamically deflected laser b ams by an imaging optical system into spot beams on the corresponding scan targets respectively, and thereby scanning the spot beams in a main scanning direction on the corresponding scan targets respectively. In the scanning optical system, the deflecting system includes at least one reflecting surface which simultaneously deflects the laser beams that are incident on the reflecting surface at incident angles differing in an auxiliary scanning direction perpendicular to the main scanning direction. The imaging optical system includes: a front lens group having positive refractive power for converging all the laser beams from the deflecting system principally in the main scanning direction while deflecting at least a pair of laser beams selected from the laser beams obliquely incident on the reflecting surface so as to let the selected laser beams deviate from an optical surface reference axis of the front lens group; and a plurality of rear lens groups each of which has positive refractive power for converging each of the laser beams that passed through the front lens group principally in the auxiliary scanning direction.

With such configuration of the scanning optical system, even when the optical path length is relatively short, scan line curves can be satisfactorily corrected while fulfilling basic specs of scanning performance required of scanning optical systems, and furthermore, the twist of the wavefront can be reduced to a sufficiently low level. Therefore, the laser beams can be separated sufficiently to match the intervals between the scan targets without the need of using mirrors which cause the color misregistration and increasing the cost, by which variations in the scanning performance causing the color misregistration can be prevented.

Optionally, at least one surface of the front lens group may have a plurality of areas of different shapes for interacting with the laser beams respectively.

Still optionally, the at least one surface of the front lens group may be formed as a step-like optical surface in which lens thickness changes at each boundary between adjacent areas.

Still optionally, each area of the at least one surface of the front lens group may be formed as a two-dimensional polynomial aspherical surface which is expressed by a polynomial expression regarding heights in the main scanning direction and the auxiliary scanning direction.

In a particular case, the two-dimensional polynomial aspherical surface of the front lens group may be asymmetric in the main scanning direction.

Additionally or alternatively, the two-dimensional polynomial aspherical surface of the front lens group may be asymmetric in the auxiliary scanning direction.

Optionally, surfaces on at least one side of the rear lens groups may be formed so as not to be in the same shape.

Still optionally, at least one surface of each of the rear lens groups may be formed as a two-dimensional polynomial aspherical surface which is expressed by a polynomial expression regarding heights in the main scanning direction and the auxiliary scanning direction.

In a particular case, the two-dimensional polynomial aspherical surface of each of the rear lens groups may be symmetric with respect to the optical surface reference axis in the main scanning direction.

Additionally or alternatively, the two-dimensional polynomial aspherical surface of each of the rear lens groups may be asymmetric in the auxiliary scanning direction.

Optionally, the pair of laser beams obliquely incident on the deflecting system travel at the same tilt angle on both sides of a main scanning plane which is defined as an imaginary plane parallel to the main scanning direction and including the optical surface reference axis of the front lens group. In this case, rear lens groups for transmitting the pair of laser beams respectively are formed in shapes mirror-symmetrical with each other with respect to the main scanning plane as a symmetry plane.

Still optionally, the pair of laser beams obliquely incident on the deflecting system travel at the same tilt angle on both sides of a main scanning plane which is defined as an imaginary plane parallel to the main scanning direction and including the optical surface reference axis of the front lens group. In this case, areas of the front lens group for interacting with the pair of laser beams respectively are formed in shapes mirror-symmetrical with each other with respect to the main scanning plane as a symmetry plane.

Still optionally, the pair of beams are deviated from the optical surface reference axis of the front lens group by the front lens group in the auxiliary scanning direction.

According to another aspect of the invention, there is provided a scanning optical system for dynamically deflecting a plurality of laser beams by a deflecting system for a plurality of scan targets which are provided corresponding to the laser beams and parallelly arranged at preset intervals, converging the dynamically deflected laser beams by an imaging optical system into spot beams on said corresponding scan targets respectively, and thereby scanning the spot beams in a main scanning direction on said corresponding scan targets respectively. In the scanning optical system, the deflecting system includes at least one reflecting surface which simultaneously deflects the laser beams that are incident on the at least one reflecting surface at incident angles differing in an auxiliary scanning direction perpendicular to the main scanning direction. The imaging optical system includes: a front lens group having positive refractive power for converging all the laser beams from said deflecting system principally in the main scanning direction while deflecting at least a pair of laser beams selected from the laser beams so that the pair of laser beams are deviated from an optical surface reference axis of said front lens group in the auxiliary scanning direction; and a plurality of rear lens groups each of which has positive refractive power for converging each of the laser beams that passed through said front lens group principally in the auxiliary scanning direction.

With such configuration of the scanning optical system, even when the optical path length is relatively short, scan line curves can be satisfactorily corrected while fulfilling basic specs of scanning performance required of scanning optical systems, and furthermore, the twist of the wavefront can be reduced to a sufficiently low level. Therefore, the laser beams can be separated sufficiently to match the intervals between the scan targets without the need of using mirrors which cause the color misregistration and increasing the cost, by which variations in the scanning performance causing the color misregistration can be prevented.

BRIEF DESCRIPTION OF THE ACCOMPANYING DRAWINGS

The objects and features of the present invention will become more apparent from the consideration of the following detailed description taken in conjunction with the accompanying drawings, in which.

DETAILED DESCRIPTION OF THE EMBODIMENTS

Referring now to the drawings, a description will be given in detail of a preferred embodiment in accordance with the present invention.

The scanning optical system explained below will be assumed to be installed in a color laser printer that prints a color image at high speed by successively transferring four toner images of four color components (yellow, magenta, cyan and black) to paper during one paper feed cycle.

Figure 1:
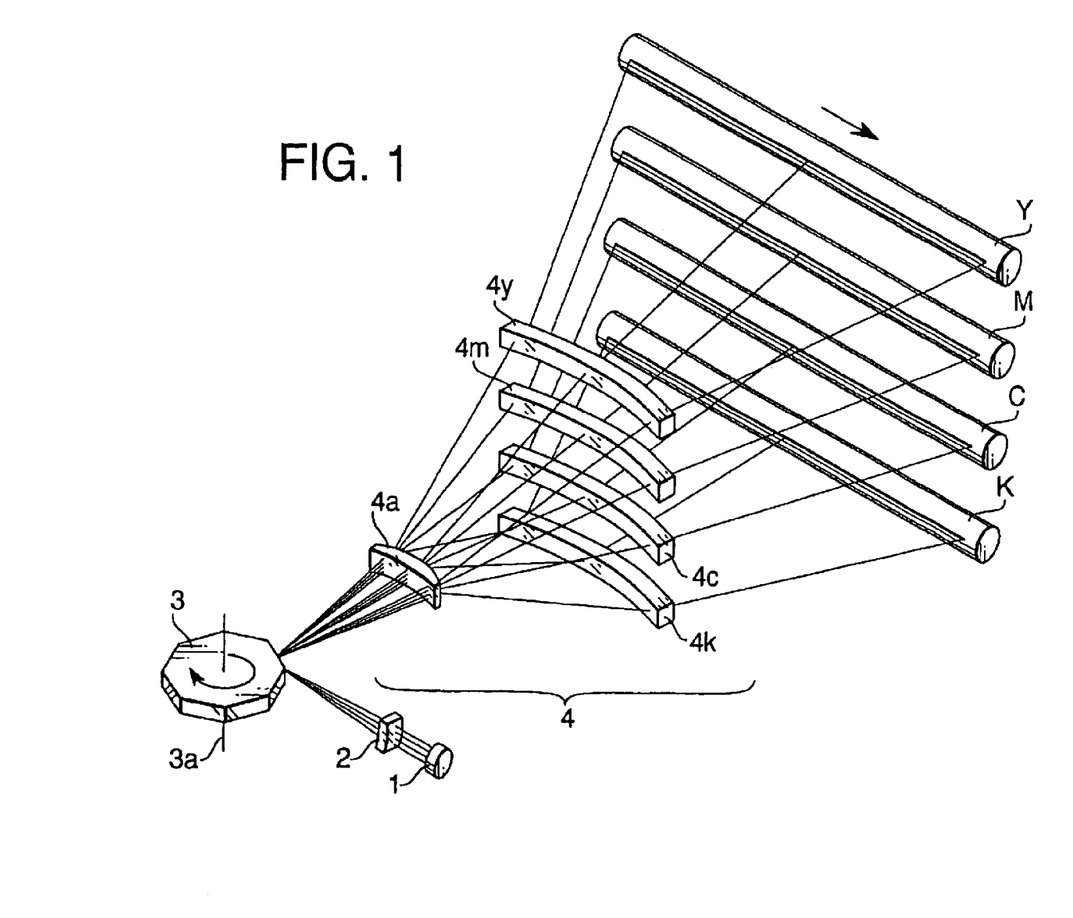
FIG. 1 is a perspective view schematically showing the optical composition of a scanning optical system in accordance with an embodiment of the present invention.
Figure 2:
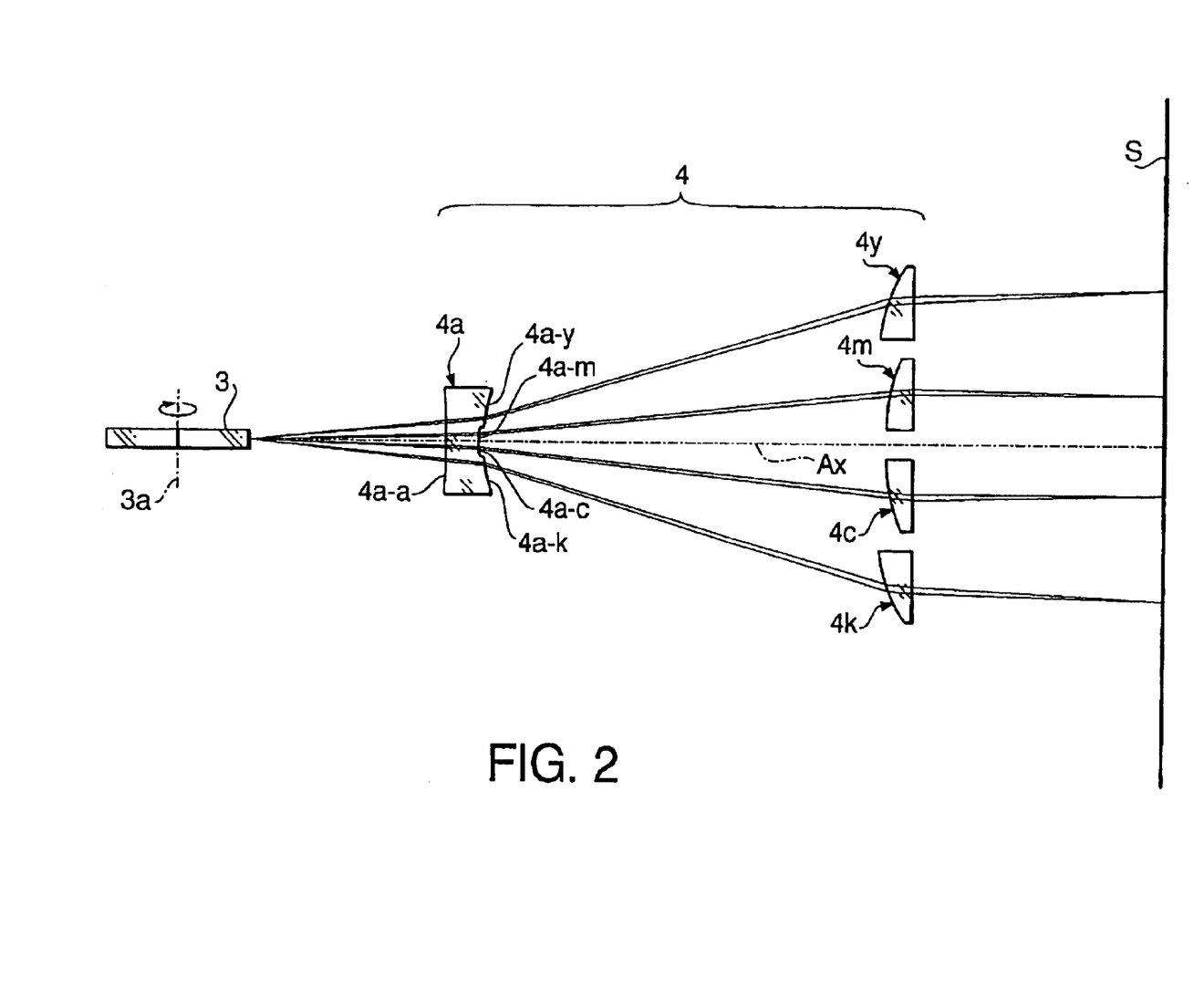
FIG. 2 is an optical block diagram of the scanning optical system seen in the main scanning direction.

FIG. 1 is a perspective view schematically showing the optical configuration of a scanning optical system in accordance with an embodiment of the present invention. FIG. 2 is an optical block diagram of the principal part of the scanning optical system seen in the main scanning direction. The scanning optical system of this embodiment is a system having four photosensitive drums that are scanned with four separate laser beams respectively. As shown in FIG. 1, the scanning optical system includes a photosensitive drum Y for yellow, a photosensitive drum M for magenta, a photosensitive drum C for cyan and a photosensitive drum K for black which are arranged in parallel at preset intervals in the aforementioned order.

In the laser printer including the scanning optical system, the photosensitive drums Y, M, C, K are arranged along the paper feed direction (top-to-bottom direction in FIG. 1). Incidentally, the surfaces of the four photosensitive drums Y, M, C, K are drawn simply in FIG. 2 as one scan target surface S. As shown in FIGS. 1 and 2, the scanning optical system includes a light source unit 1, a cylindrical lens 2, a polygon mirror 3 and an imaging optical system 4.

<Light Source Unit>

First, the light source unit 1 will be explained in detail. The light source unit 1 includes a laser diode chip in which four laser diodes corresponding to the four color components are integrated into one body, a collimator lens for collimating the laser beams (emitted from the laser diodes as diverging beams) into parallel beams, etc. From the light source unit 1, four laser beams corresponding to the four color components are outputted being parallelly arranged in a plane at even intervals. The direction in which the four laser beams are arranged is parallel to the paper feed direction.

<Cylindrical Lens>

Next, the cylindrical lens 2 will be explained. The cylindrical lens 2 has a cylindrical surface on the beam incident side and a plane surface on the beam emerging side. The cylindrical lens 2 converges the four laser beams emitted by the light source unit 1 on a point only in the auxiliary scanning direction.

<Polygon Mirror>

Next, the polygon mirror 3 will be explained in detail. The polygon mirror 3 is formed in the shape of a low-profile regular octagonal prism having eight lateral faces as reflecting surfaces. The polygon mirror 3, having a central axis 3a parallel to the paper feed direction, is placed at a proper position so that one of its lateral faces (reflecting surfaces) will be put in the vicinity of the point where the four laser beams from the cylindrical lens 2 converge.

Being driven and revolved around the central axis 3 a at a constant angular velocity, the polygon mirror 3 functions as a deflecting system for dynamically deflecting the laser beams. The four laser beams that passed through the cylindrical lens 2 are simultaneously reflected by one reflecting surface of the polygon mirror 3 toward the imaging optical system 4. According to the rotation of the polygon mirror 3, the four laser beams are dynamically deflected in the main scanning direction.

If we define a "main scanning plane" as an imaginary plane including the converging point (where the four laser beams converge) and orthogonal to the central axis 3a of the polygon mirror 3, the main scanning plane is situated in between the inner two photosensitive drums M and C. Out of the four laser beams incident on the polygon mirror 3, inner two beams travel symmetrically on both sides of the main scanning plane, and outer two beams also travel symmetrically on both sides of the main scanning plane. Thus, the inner two laser beams have opposite tilt angles relative to the main scanning plane (the same absolute value of tilt angle), and the outer two laser beams similarly have opposite tilt angles relative to the main scanning plane (the same absolute value of tilt angle).

<Imaging Optical System>

Next, the imaging optical system 4 will be explained in detail. The imaging optical system 4 is a group of lenses having the function of correcting the scanning speed, which includes a front lens group 4a (on the side facing the polygon mirror 3) and rear lens groups 4y, 4m, 4c and 4k (on the side facing the photosensitive drums Y, M, C and K). Incidentally, at least one optical surface of each lens group (4a, 4y, 4m, 4c, 4k) is formed as a rotationally asymmetrical surface ("two-dimensional polynomial aspherical surface") as will be explained later, and such a rotationally asymmetrical optical surface does not have an axis like the symmetry axis of a rotationally symmetrical optical surface. Therefore, a term "optical surface reference axis" is defined here as an axis passing through the "origin" that is set when the shape of the optical surface is described in a mathematical expression, and the "optical surface reference axis" will hereafter be regarded as one that corresponds to the symmetry axis of a rotationally symmetrical optical surface (i.e. the optical axis).

The front lens group 4a has power for deflecting the laser beams (which have been dynamically deflected by the polygon mirror 3) to deviate from the optical surface reference axis both in the main scanning direction and in the auxiliary scanning direction while converging the laser beams principally in the main scanning direction. The front lens group 4a is placed to have its optical surface reference axis Ax situated on the main scanning plane. The front surface 4a–a of the front lens group 4a is formed as a continuous surface having rotational symmetry, with its symmetry axis coinciding with the optical surface reference axis Ax.

Meanwhile, the rear surface of the front lens group 4a is formed to have four areas 4a–y, 4a–m, 4a–c and 4a–k of different shapes specifically designed to transmit the four laser beams respectively adding separate effects to them. Concretely, the rear surface is formed as a step-like optical surface having the discrete areas 4a–y, 4a–m, 4a–c and 4a–k of different heights arranged in the paper feed direction (the direction of the central axis 3a of the polygon mirror 3). Incidentally, the optical surface reference axis of the shape of each area (4a–y, 4a–m, 4a–c, 4a–k) of the rear surface coincides with the optical surface reference axis Ax of the front lens group 4a.

Since the inner two laser beams travel symmetrically on both sides of the main scanning plane in this embodiment, the inner two areas 4a–m and 4a–c of the rear surface interacting with the inner two laser beams are formed as two mirror-symmetrical surfaces with respect to the main scanning plane as the symmetry plane. Similarly, the outer two areas 4a–y and 4a–k of the rear surface interacting with the outer two laser beams are formed as two mirror-symmetrical surfaces with respect to the main scanning plane as the symmetry plane. Therefore, the whole front lens group 4a is formed in a shape having mirror symmetry with respect to the main scanning plane.

Each rear lens group (4y, 4m, 4c, 4k) has power for converging a corresponding laser beam (which has been dynamically deflected by the polygon mirror 3 and which passed through the front lens group 4a) principally in the auxiliary scanning direction, while having the function of compensating for curvature of field in the auxiliary scanning direction. Out of the rear lens groups 4y, 4m, 4c and 4k, inner two rear lens groups 4m and 4c for the inner two laser beams traveling nearby the main scanning plane (hereafter, also referred to as "inner optical systems") are formed in shapes that are mirror-symmetrical with each other and are placed at positions and in directions that are mirror-symmetrical with each other with respect to the main scanning plane (symmetry plane).

Similarly, outer two rear lens groups 4y and 4k for the outer two laser beams traveling apart from the main scanning plane (hereafter, also referred to as "outer optical systems") are formed in shapes mirror-symmetrical with each other and are placed at positions and in directions mirror-symmetrical with each other with respect to the main scanning plane (symmetry plane).

The four laser beams dynamically deflected by the polygon mirror 3 successively pass through the front lens group 4a and the rear lens groups 4y, 4m, 4c and 4k, by which the laser beams are converged into spot beams on separate photosensitive drums Y, M, C and K, respectively. Each spot beam scans the surface of a corresponding photosensitive drum (Y, M, C or K) in the main scanning direction (shown with a straight arrow in FIG. 1) at a constant speed. Each laser beam to repetitively scan the surface of each photosensitive drum (Y, M, C, K) has been on-off modulated according to image information. Thus, on the surface of each photosensitive drum rotated at a constant angular velocity, two-dimensional electrostatic latent image composed of a plurality of dots is formed.

<Numerical Configuration of Scanning Optical System>

Figure 3:
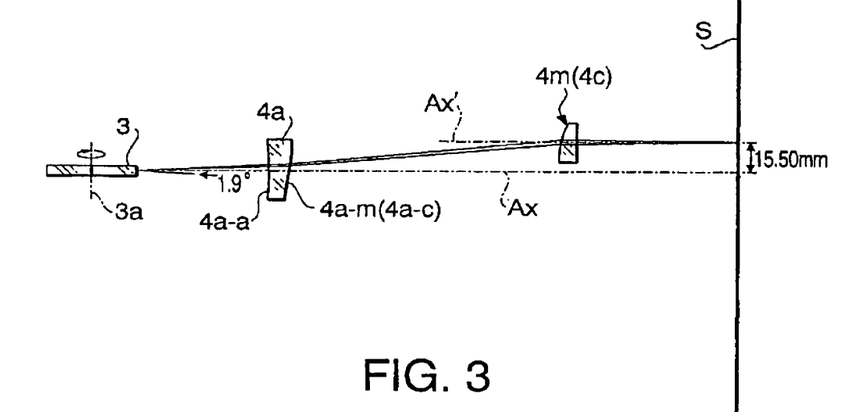
FIG. 3 is an optical block diagram of an inner optical system of the scanning optical system seen in the main scanning direction.
Figure 4:
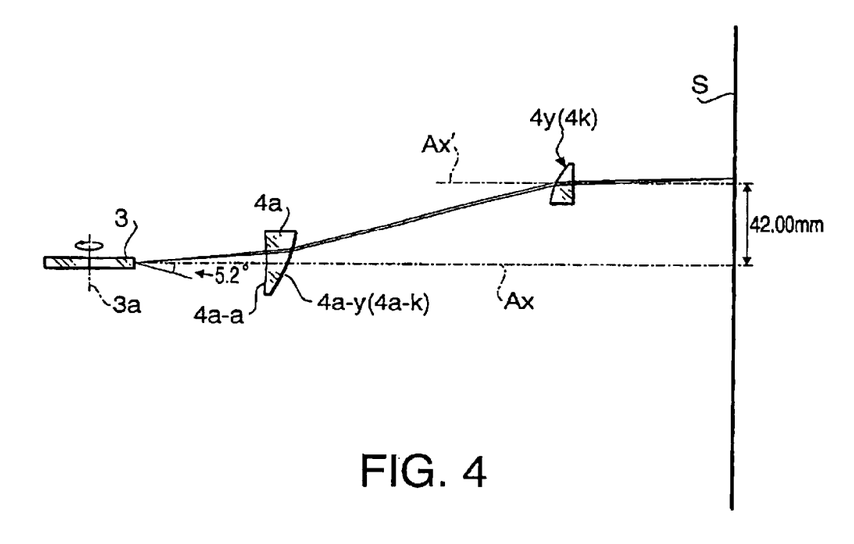
FIG. 4 is an optical block diagram of an outer optical system of the scanning optical system seen in the main scanning direction.

In the following, concrete numerical configuration of the scanning optical system of this embodiment will be explained In detail. The following Tables 1 and 2 show concrete numerical configuration of the inner optical system and the outer optical system of the scanning optical system of this embodiment, respectively. FIG. 3 is an optical block diagram of the inner optical system seen in the main scanning direction, and FIG. 4 is an optical block diagram of the outer optical system seen in the main scanning direction.

In FIG. 3, in addition to the inner area 4a–m (4a–c) of the rear surface of the front lens group 4a for transmitting the inner laser bean, the whole shape of an imaginary lens including the inner area 4a–m (4a–c) is shown, without showing the shape of the outer area 4a–y (4a–k) for transmitting the outer laser beam. In contrast, in FIG. 4, the whole shape of an imaginary lens including the outer area 4a–y (4a–k) for transmitting the outer laser beam is shown, without showing the shape of the inner area 4a–m (4a–c) for transmitting the inner laser beam.

TABLE 1

| Surface | Ry | Rz | d | N | DECZ |
|---|---|---|---|---|---|
| #1 | ∞ | −51.080 | 4.000 | 1.51072 | 0.00 |
| #2 | ∞ | ∞ | 97.000 | — | — |
| #3 | ∞ | ∞ | 62.610 | — | 0.00 |
| #4 | −185.410 | −185.410 | 10.000 | 1.48617 | 0.00 |
| #5 | −67.00 | −100.000 | 132.470 | — | — |
| #6 | −427.700 | −427.700 | 5.000 | 1.48617 | 15.50 |
| #7 | −695.750 | −695.720 | 79.730 | — | — |
| #8 | ∞ | ∞ | — | — | −0.65 |

TABLE 2

| Surface | Ry | Rz | d | N | DECZ |
|---|---|---|---|---|---|
| #1 | ∞ | −51.080 | 4.000 | 1.51072 | 0.00 |
| #2 | ∞ | ∞ | 97.000 | — | — |
| #3 | ∞ | ∞ | 62.610 | — | 0.00 |
| #4 | −185.410 | −185.410 | 10.000 | 1.48617 | 0.00 |
| #5 | −67.00 | −100.000 | 132.470 | — | — |
| #6 | −400.900 | −400.900 | 8.000 | 1.48617 | 42.00 |
| #7 | −695.720 | −695.720 | 79.730 | — | — |
| #8 | ∞ | ∞ | — | — | 3.62 |

In Tables 1 and 2, the character "No" indicates surface numbers that are assigned to optical surfaces of the scanning optical system starting from the front surface of the cylindrical lens 2 (on the beam incident side), in which No. 1 and No. 2 denote the front and rear surfaces of the cylindrical lens 2, No. 3 denotes a reflecting surface of the polygon mirror 3, No. 4 denotes the front surface of the front lens group 4a, No. 5 in Table 1 denotes the inner area 4a–m (4a–c) of the rear surface of the front lens group 4a, No. 5 in Table 2 denotes the outer area 4a–y (4a–k) of the rear surface of the front lens group 4a, No. 6 and No. 7 in Table 1 denote the front and rear surfaces of the inner rear lens group 4m (4c), No. 6 and No. 7 in Table 2 denote the front and rear surfaces of the outer rear lens group 4y (4k), and No. 8 denotes the scan target surface S.

The character "Ry" denotes the curvature radius [mm] of each optical surface on its optical surface reference axis measured in the main scanning direction, and "Rz" denotes the curvature radius [mm] of each optical surface on its optical surface reference axis measured in the auxiliary scanning direction. The character "d" denotes the distance [mm] between the optical surface and the next optical surface measured on the optical surface reference axis, and "N" denotes the refractive index of each lens at a d sign wavelength 780 nm.

The character "DECZ" generally denotes a shift amount [mm] of the optical surface reference axis of each optical surface relative to the optical surface reference axis of the anterior surface measured in the auxiliary scanning direction. Concretely, for each rear lens group (4y, 4m, 4c, 4k), "DECZ" means the shift amount [mm] of its optical surface reference axis Ax' (see FIGS. 3 and 4 ) relative to the optical surface reference axis Ax measured in the auxiliary scanning direction. For the scan target surface S (No. 8), "DECZ" means the shift amount [mm] of the laser beam incident point on the scan target surface S relative to the optical surface reference axis Ax' measured in the auxiliary scanning direction. The focal length of the whole system is 220 mm and the effective scan width on the scan target surface S is 216 mm.

Figure 5:
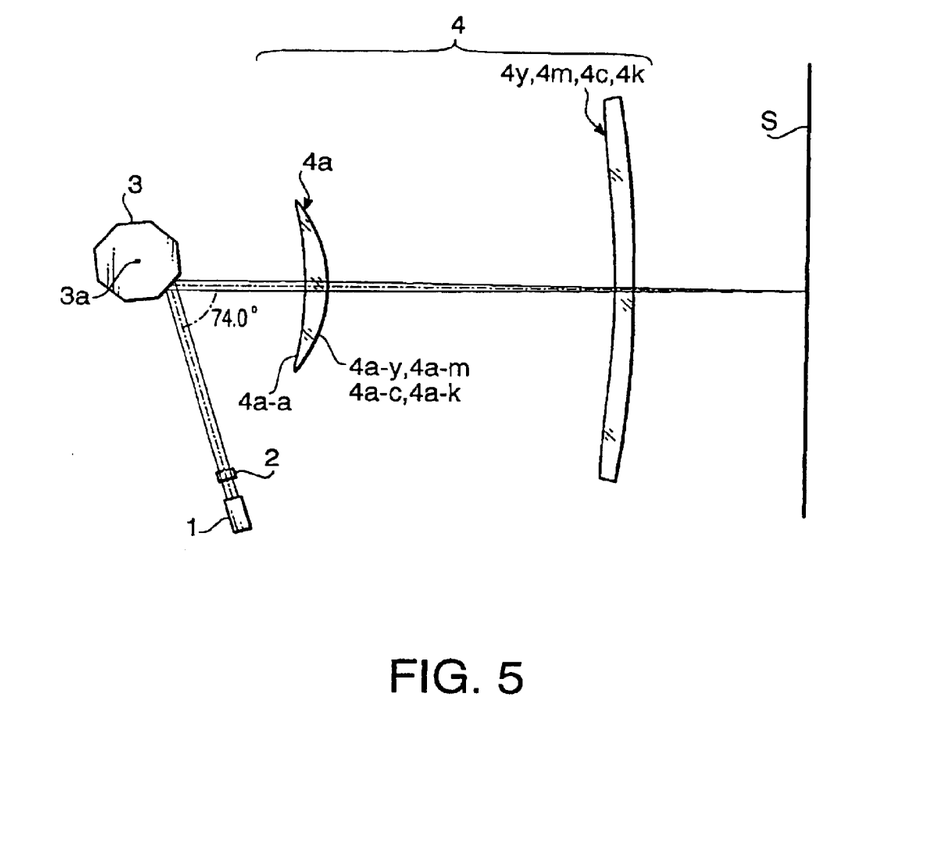
FIG. 5 is an optical block diagram of the scanning optical system seen in the auxiliary scanning direction.

If we define an "auxiliary scanning plane" as an imaginary plane including the optical surface reference axis Ax and perpendicular to the main scanning plane, when the optical path of each laser beam incident on the polygon mirror 3 is projected on the auxiliary scanning plane, the incident angle of the inner laser beam on the reflecting surface of the polygon mirror 3 of this embodiment is 1.9° as shown in FIG. 3, and the incident angle of the outer laser beam on the reflecting surface of the polygon mirror 3 is 5.2° as shown in FIG. 4. Meanwhile, when the optical path of each laser beam incident on the polygon mirror 3 is projected on the main scanning plane, each incident laser beam is tilted relative to the optical surface reference axis Ax by 74.0° as shown in FIG. 5.

In this embodiment, the front surface 4a–a of the front lens group 4a (4th optical surface) is formed as a concave spherical surface, and the rear surface (4a–y, 4a–m, 4a–c, 4a–k) of the front lens group 4a (5th optical surface) is formed as a two-dimensional polynomial aspherical surface. The front surfaces of the inner and outer rear lens groups 4y, 4m, 4c and 4k (6th optical surfaces) are also formed as two-dimensional polynomial aspherical surfaces. The rear surfaces of the rear lens groups 4y, 4m, 4c and 4k (7th optical surfaces) are formed as convex spherical surfaces.

The "two-dimensional polynomial aspherical surface" means a curved optical surface whose SAG amount from an imaginary reference plane is defined by a polynomial expression X(y,z) including variables y and z as two-dimensional coordinates on the reference plane in the main scanning direction (y direction) and the auxiliary scanning direction (z direction). In the two-dimensional coordinates, the origin is defined as the intersecting point of the reference plane and a single reference axis that is perpendicular to the reference plane. Concretely, the shape of the two-dimensional polynomial aspherical surface is expressed as explained below.

The two-dimensional polynomial aspherical surface is expressed by the following SAG amount X (y,z) from the reference plane, measured at each point (y,z) on the reference plane:

$$X(y,z)=C(y^2+z^2)/\{1+\sqrt{1-(1+\kappa)C^2(y^2+z^2)}\}+\Sigma\Sigma B(m,n)y^m z^n \quad (1)$$

where "C" denotes the curvature (1/Ry: the inverse of the curvature radius Ry shown in Table 1) on the optical surface reference axis measured in the main scanning direction, "κ" denotes a conical coefficient, and "B(m,n)" with non-negative integers m and n denotes an aspherical surface coefficient of m-th and n-th orders in the main and auxiliary scanning directions respectively.

The following Table 3 (for the inner optical system) and Table 4 (for the outer optical system) show concrete examples of the aspherical surface coefficients B(m,n) when the 5th optical surface (rear surface of the front lens group 4a) is described by the expression (1). Aspherical surface coefficients B(m,n) having values 0 are omitted in Tables 3 and 4. The conical coefficient κ in the expression (1) of the 5th optical surface is 0.000 for both the inner and outer optical systems.

In Tables 3 and 4, aspherical surface coefficients B(m,n) with "m" of odd orders (m=1, 3, 5, . . . ) are nonzero, therefore, the rear surface (4a–y, 4a–m, 4a–c, 4a–k) of the front lens group 4a (5th optical surface) is asymmetric in the main scanning direction with respect to the optical surface reference axis. Further, since aspherical surface coefficients B(m,n) with "n" of odd orders (n=1, 3, 5, . . . ) are also nonzero, the rear surface (4a–y, 4a–m, 4a–c, 4a–k) is asymmetric also in the auxiliary scanning direction with respect to the optical surface reference axis.

The following Table 5 (for the inner optical system) and Table 6 (for the outer optical system) show concrete examples of the aspherical surface coefficients B(m,n) when the 6th optical surface (front surface of a rear lens group) is described by the expression (1). Aspherical surface coefficients B(m,n) having values 0 are omitted in Tables 5 and 6. The conical coefficient κ in the expression (1) of the 6th optical surface is 0.000 for both the inner and outer optical systems.

TABLE 3

| $B_{mn}$ | n = 0 | n = 1 | n = 2 | n = 3 | n = 4 |
|---|---|---|---|---|---|
| m = 0 | 0.0000 | 1.4790E−01 | 3.4730E−03 | −1.8260E−04 | 1.7420E−06 |
| m = 1 | −1.7460E−05 | 7.9330E−06 | 2.5380E−06 | −9.5680E−07 | 1.5070E−07 |
| m = 2 | 6.2720E−05 | 3.9620E−06 | 2.2500E−06 | −6.3370E−08 | −1.2000E−08 |
| m = 3 | 2.3890E−07 | −1.4120E−07 | 6.0670E−08 | −7.7220E−09 | −2.3150E−10 |
| m = 4 | 1.5000E−07 | 1.2840E−09 | −1.0030E−09 | 1.1830E−10 | −6.3320E−12 |
| m = 5 | −1.0560E−10 | 0.0000 | −1.3710E−13 | 6.6090E−13 | −1.6460E−13 |
| m = 6 | 1.6890E−11 | 1.0650E−12 | −6.8390E−13 | 1.1720E−13 | 2.2870E−15 |
| m = 8 | 6.1110E−15 | | | | |

TABLE 4

| $B_{mn}$ | n = 0 | n = 1 | n = 2 | n = 3 | n = 4 |
|---|---|---|---|---|---|
| m = 0 | 0.0000 | 4.0310E−01 | 1.6570E−04 | 4.4290E−06 | −2.0080E−07 |
| m = 1 | −1.5690E−04 | −7.7550E−05 | 3.5050E−05 | −3.9660E−06 | 1.3770E−07 |
| m = 2 | 4.1050E−04 | 5.0450E−07 | 4.0540E−06 | −1.2460E−08 | −1.1210E−08 |
| m = 3 | 3.1650E−06 | −1.2840E−06 | 1.7010E−07 | −6.0230E−09 | −1.3660E−10 |
| m = 4 | 1.6290E−07 | 1.6550E−08 | −2.2010E−09 | 1.1180E−10 | −6.4090E−12 |
| m = 5 | −1.4820E−10 | 0.0000 | −1.2140E−12 | 1.4610E−12 | −1.5490E−13 |
| m = 6 | 1.7710E−11 | 5.2480E−12 | −1.4120E−12 | 9.3990E−14 | 1.8890E−15 |
| m = 8 | 7.8250E−15 | | | | |

TABLE 5

| $B_{mn}$ | n = 0 | n = 1 | n = 2 | n = 3 | n = 4 |
|---|---|---|---|---|---|
| m = 0 | 0.0000 | 2.1860E−01 | 1.7000E−02 | −1.1650E−05 | −2.5240E−06 |
| m = 2 | 2.3280E−05 | −1.4020E−06 | −2.4480E−07 | −1.5820E−08 | −6.6080E−10 |
| m = 4 | 8.0310E−08 | −3.3670E−10 | 1.3800E−11 | −2.9060E−13 | −3.3280E−14 |
| m = 6 | −1.2360E−12 | 1.5350E−14 | −1.2270E−15 | 2.2660E−16 | −2.5240E−14 |
| m = 8 | −1.6530E−17 | | | | |

TABLE 6

| $B_{mn}$ | n = 0 | n = 1 | n = 2 | n = 3 | n = 4 |
|---|---|---|---|---|---|
| m = 0 | 0.0000 | 4.2370E−01 | 1.4510E−02 | 7.9270E−06 | −2.3440E−06 |
| m = 2 | 1.5410E−04 | −1.9500E−07 | −2.0920E−07 | −1.3280E−08 | −6.5640E−10 |
| m = 4 | 7.0530E−08 | −8.3290E−10 | 3.8090E−11 | 1.6690E−13 | −3.2900E−14 |
| m = 6 | −6.2170E−13 | 3.0600E−14 | −3.0700E−15 | 2.4940E−16 | −2.5070E−18 |
| m = 8 | 3.4540E−17 | | | | |

In Tables 5 and 6, aspherical surface coefficients B(m,n) with "n" of odd orders (m=1, 3, 5, . . . ) are all zero, therefore, the front surface of each rear lens group (4y, 4m, 4c, 4k) (6th optical surface) has a shape that changes symmetrically in the main scanning direction with respect to its origin.

Figure 6A:
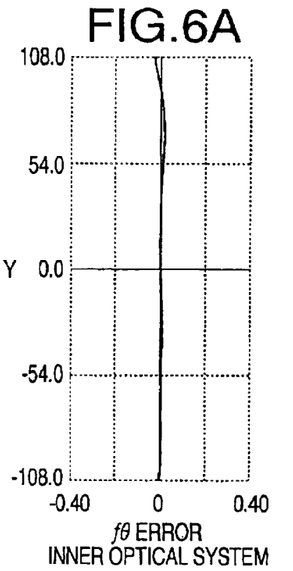
FIGS. 6A through 6D are graphs showing fθ characteristics, curvature of field, a scan line curve and wavefront aberration of the inner optical system.
Figure 6B:
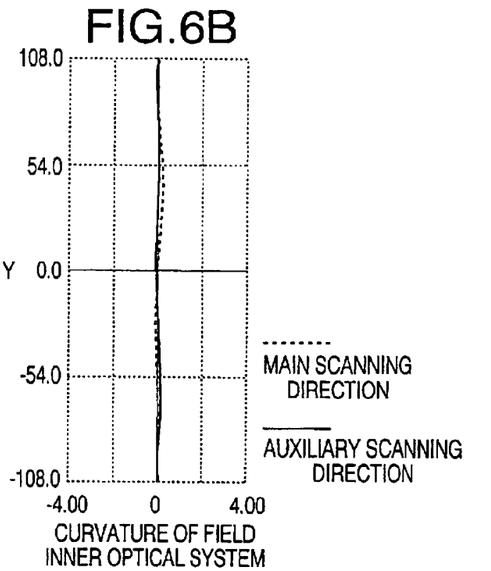
Figure 6C:
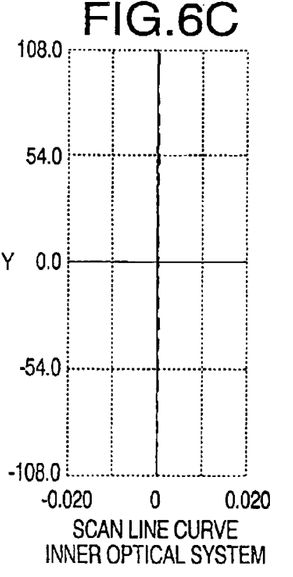
Figure 6D:
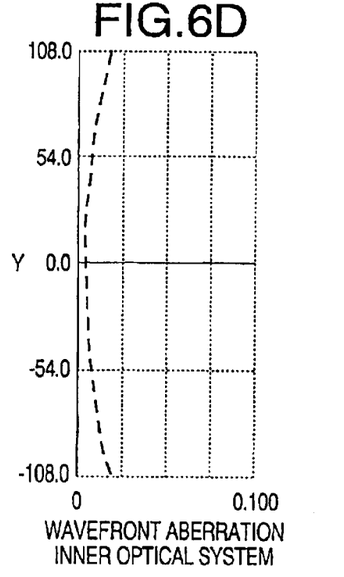
Figure 7A:
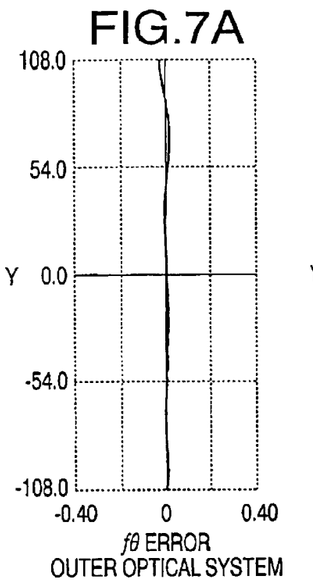
FIGS. 7A through 7D are graphs showing fθ characteristics, curvature of field, a scan line curve and wavefront aberration of the outer optical system.
Figure 7B:
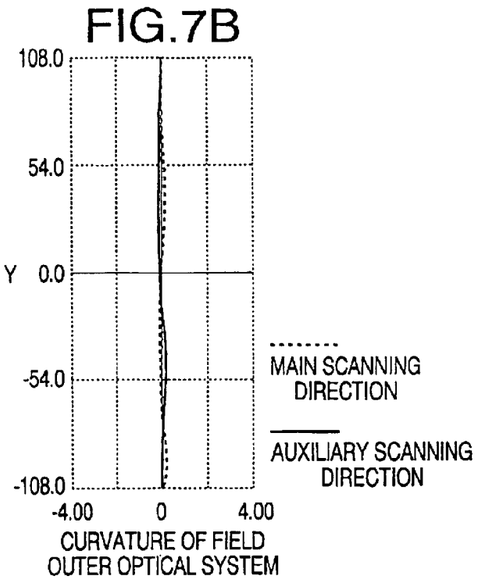
Figure 7C:
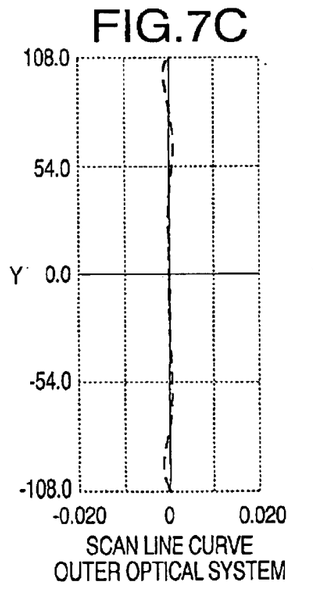
Figure 7D:
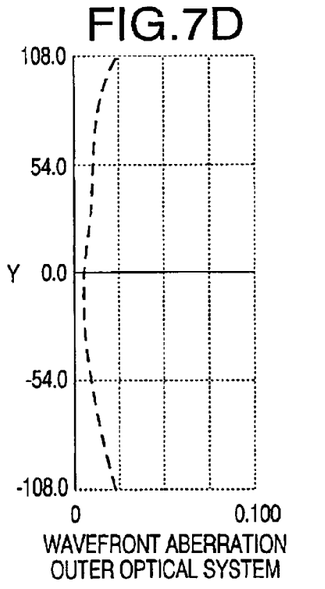

FIGS. 6A through 6D and FIGS. 7A through 7D are graphs showing optical performance figures of the inner optical system and the outer optical system of the scanning optical system respectively, in which FIGS. 6A and 7A show fθ errors (deviation of the spot beam on the scan target surface S from the ideal position measured in the main scanning direction), FIGS. 6B and 7B show curvatures of field (deviation of the image focusing position from the ideal plane measured in the optical axis direction) in the main scanning direction (broken line) and in the auxiliary scanning direction (solid line), FIGS. 6C and 7C show scan line curves (Bow), and FIGS. 6D and 7D show wavefront aberrations. In each graph, the vertical axis (y) denotes the scan position in the main scanning direction [mm], and the horizontal axis (x) denotes the amount of aberration. The unit of aberration on the horizontal axis is [mm] in FIGS. 6A–6C and FIGS. 7A–7C and [λ] (wavelength) in FIGS. 6D and 7D.

Figure 8:
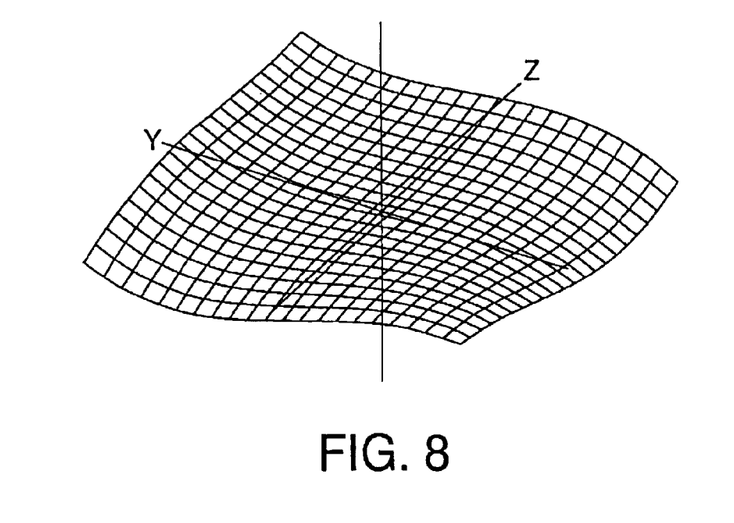
FIG. 8 is a graph showing wavefront aberration of a laser beam scanned by the scanning optical system of the embodiment.

FIG. 8 is a wavefront aberration diagram of the scanning optical system of this embodiment, in which the two endpoints of the vertical axis (representing the amount of aberration) are apart from the origin by ±0.2λ.

As shown in FIGS. 6A through 8, the scanning optical system of this embodiment satisfactorily corrects the Bow (the scan line curve) while fulfilling basic specs of scanning performance (fθ error, curvature of field) required of scanning optical systems. Further, the twist of the wavefront is reduced to a sufficiently low level.

Further, according to the scanning optical system of the above embodiment, the optical path length between the polygon mirror 3 and the photosensitive drums Y, M, C and can be shortened, by which the need of using mirrors in the imaging optical system 4 (causing the color misregistration and increasing the manufacturing cost) is eliminated.

Therefore, the laser beams can be separated sufficiently to match the intervals between the photosensitive drums without the need of long optical paths, without deteriorating the scanning performance, and without the need of using mirrors causing the color misregistration and increasing the cost.

While the present invention has been described with reference to the particular illustrative embodiments, it is not to be restricted by those embodiments but only by the appended claims. For example, while a polygon mirror was employed as the deflecting system for dynamically deflecting the laser beams in the above embodiment, other types of deflecting systems such as a galvanometer mirror can also be employed in the scanning optical system and the present invention is also applicable to such scanning optical systems. It is to be appreciated that those skilled in the art can change or modify the embodiments without departing from the scope and spirit of the present invention.

The present disclosure relates to the subject matter contained in Japanese Patent Application No. P2002-265668, filed on Sep. 11, 2002, which is expressly incorporated herein by reference in its entirety.

What is claimed is:

1. A scanning optical system for dynamically deflecting a plurality of laser beams by a deflecting system for a plurality of scan targets which are provided corresponding to the laser beams and parallelly arranged at preset intervals, converging the dynamically deflected laser beams by an imaging optical system into spot beams on said corresponding scan targets respectively, and thereby scanning the spot beams in a main scanning direction on said corresponding scan targets respectively, wherein said deflecting system includes at least one reflecting surface which simultaneously deflects the laser beams that are incident on the at least one reflecting surface at incident angles differing in an auxiliary scanning direction perpendicular to the main scanning direction, and wherein said imaging optical system including:

a front lens group having positive refractive power for converging all the laser beams from said deflecting system principally in the main scanning direction while deflecting at least a pair of laser beams selected from the laser beams obliquely incident on said at least one reflecting surface so as to let the selected laser beams deviate from an optical surface reference axis of said front lens group; and a plurality of rear lens groups each of which has positive refractive power for converging each of the laser beams that passed through said front lens group principally in the auxiliary scanning direction.

2. The scanning optical system according to claim 1, wherein at least one surface of said front lens group has a plurality of areas of different shapes for interacting with the laser beams respectively.

3. The scanning optical system according to claim 2, wherein said at least one surface of said front lens group is formed as a step-like optical surface in which lens thickness changes at each boundary between adjacent areas.

4. The scanning optical system according to claim 2, wherein each area of said at least one surface of said front lens group is formed as a two-dimensional polynomial aspherical surface which is expressed by a polynomial expression regarding heights in the main scanning direction and the auxiliary scanning direction.

5. The scanning optical system according to claim 4, wherein said two-dimensional polynomial aspherical surface of said front lens group is asymmetric in the main scanning direction.

6. The scanning optical system according to claim 4, wherein said two-dimensional polynomial aspherical surface of said front lens group is asymmetric in the auxiliary scanning direction.

7. The scanning optical system according to claim 1, wherein surfaces on at least one side of said rear lens groups are formed so as not to be in the same shape.

8. The scanning optical system according to claim 1, wherein at least one surface of each of said rear lens groups is formed as a two-dimensional polynomial aspherical surface which is expressed by a polynomial expression regarding heights in the main scanning direction and the auxiliary scanning direction.

9. The scanning optical system according to claim 8, wherein said two-dimensional polynomial aspherical surface of each of said rear lens groups is symmetric with respect to the optical surface reference axis in the main scanning direction.

10. The scanning optical system according to claim 8, wherein said two-dimensional polynomial aspherical surface of each of said rear lens groups is asymmetric in the auxiliary scanning direction.

11. The scanning optical system according to claim 1,
wherein said pair of laser beams obliquely incident on said deflecting system travel at the same tilt angle on both sides of a main scanning plane which is defined as an imaginary plane parallel to the main scanning direction and including the optical surface reference axis of said front lens group, and
wherein rear lens groups for transmitting said pair of laser beams respectively are formed in shapes mirror-symmetrical with each other with respect to the main scanning plane as a symmetry plane.

12. The scanning optical system according to claim 1,
wherein said pair of laser beams obliquely incident on said deflecting system travel at the same tilt angle on both sides of a main scanning plane which is defined as an imaginary plane parallel to the main scanning direction and including the optical surface reference axis of said front lens group, and
wherein areas of said front lens group for interacting with said pair of laser beams respectively are formed in shapes mirror-symmetrical with each other with respect to the main scanning plane as a symmetry plane.

13. The scanning optical system according to claim 1, wherein said pair of beams are deviated from the optical surface reference axis of said front lens group by said front lens group in the auxiliary scanning direction.

14. A scanning optical system for dynamically deflecting a plurality of laser beams by a deflecting system for a plurality of scan targets which are provided corresponding to the laser beams and parallelly arranged at preset intervals, converging the dynamically deflected laser beams by an imaging optical system into spot beams on said corresponding scan targets respectively, and thereby scanning the spot beams in a main scanning direction on said corresponding scan targets respectively,
wherein said deflecting system includes at least one reflecting surface which simultaneously deflects the laser beams that are incident on the at least one reflecting surface at incident angles differing in an auxiliary scanning direction perpendicular to the main scanning direction, and
wherein said imaging optical system including:
a front lens group having positive refractive power for converging all the laser beams from said deflecting system principally in the main scanning direction while deflecting at least a pair of laser beams selected from the laser beams so that the pair of laser beams are deviated from an optical surface reference axis of said front lens group in the auxiliary scanning direction; and
a plurality of rear lens groups each of which has positive refractive power for converging each of the laser beams that passed through said front lens group principally in the auxiliary scanning direction.

* * * * *